United States Patent [19]

Prunet

[11] 4,317,410
[45] Mar. 2, 1982

[54] DEVICE FOR TRANSFORMING AN ENCLOSURE OR CONTAINER INTO A SELF-EVACUATING CONTAINER AND CONTAINER COMPRISING SUCH A DEVICE

[76] Inventor: Achille Prunet, Couffouleux, 81800 Rabastens, France

[21] Appl. No.: 64,844

[22] Filed: Aug. 8, 1979

[30] Foreign Application Priority Data

Aug. 16, 1978 [FR] France .............................. 78 23948
Feb. 19, 1979 [FR] France .............................. 79 04336

[51] Int. Cl.³ .............................................. C12G 1/02
[52] U.S. Cl. ...................................... 99/277.2; 426/15
[58] Field of Search ................... 99/277.2, 277.1, 277, 99/276; 426/11, 15, 16; 99/275; 366/332

[56] References Cited

U.S. PATENT DOCUMENTS 2,813,026 11/1957 Marcilly ............................... 99/277

FOREIGN PATENT DOCUMENTS 10546 3/1968 Australia .
11183 3/1968 Australia .
1945020 3/1971 Fed. Rep. of Germany .
2268719 4/1974 France .
2385625 3/1978 France .

Primary Examiner—Robert W. Jenkins
Attorney, Agent, or Firm—Sandler & Greenblum

[57] ABSTRACT

A device is provided for transforming or converting an enclosure or container into a self-emptying type of container which is equipped with such a device. The device is particularly adapted for converting an enclosure or container which is adapted to receive a fluid body which is susceptible to being separated by decantation into a liquid and a residue. One example of such a container is a vinification container which retains a liquid and a marc cake. The device comprises an axial rotating evacuation element positioned in a channel at the bottom of the container and at least one wall which is journalled to the channel and movably controlled by a system of one or more movable vertical beams. A substantially horizontal grill is movable on or with the beam system and is adapted to preserve the marc cake and to ultimately break it up so as to mix it with the juice. The journalled wall comprises one or more panels and is connected by a rod system to the vertically movable beam.

14 Claims, 5 Drawing Figures

DEVICE FOR TRANSFORMING AN ENCLOSURE OR CONTAINER INTO A SELF-EVACUATING CONTAINER AND CONTAINER COMPRISING SUCH A DEVICE

BACKGROUND OF THE INVENTION

1. Technical Field of the Invention

The present invention has for an object the use of a device allowing for the transformation of enclosures or containers which are adapted to receive a fluid body, which is adapted to be separated by decantation into an evacuable liquid, such as wine, by flowing or drafting off, and into a residue comprising agglomerated particulate solids, such as a marc cake formed by an agglomeration of stalks, small seeds and skins, into a self-emptying container.

2. Description of Prior Art

Such enclosures or containers can, for example, be conventional vinification containers which receive squeezed grape harvests, and from which, after drainage of the wine at the end of fermentation, the marc must be evacuated.

The present invention also has as an object to equip such enclosures or containers with such a transforming device.

It is known to equip enclosures of the vinification container type with a bottom of which at least one fixed inclined wall allows residue, in the form of marc, to slide on an axial evacuation means towards the exterior of the device; in the majority of cases, the evacuation means is an endless screw activated or driven by a motor element from the exterior of the enclosure.

This arrangement, even though it facilitates the evacuation of the marc, presents the inconvenience of being too inefficient. The constituents of marc, i.e., the stalks, small seeds and grapeskins, rise by floatation above the grape juice so as to comprise a compact mass, i.e., "the cake", the consistency and thickness of which render the residue difficult to evacuate and which act to retard the fermentation process.

The compact structure of the marc cake forms bridges which interfere with its evacuation by the endless screw, and it is frequently necessary to penetrate the container to break the cake. Furthermore, to obtain a satisfactory vinification it is necessary to maintain the marc cake under the level of the liquid and also to separate it in a manner which is uniform and which assures a constant mixture with the juice during the time necessary for good vinification. Known means exist allowing for the maintenance of the marc cake under the level of the juice or wine, yet these means are of the perforated cover type, and are inefficient because they do not contribute to breaking up the cake marc to allow its constant mixture with the juice.

SUMMARY OF THE INVENTION

The invention has as an object to overcome the above inconveniences by providing a device adapted to either equip existing vinification containers, or to be initially mounted, and which on one hand makes it possible to break cake marc in the course of vinification, and on the other hand facilitates the evacuation of cake marc and allows the transformation of conventional containers into self-emptying containers. To this end, the device according to the invention allows the transformation of an enclosure or container, such as a vinification container adapted to receive a fluid body, such as pressed grape harvest, which is adapted to be separated by decantation into a liquid such as wine and into a residue comprising particulate solids such as cake marc, into a self-emptying container, characterized essentially in that it positions an axially rotating evacuation device in a channel arranged at the bottom of the container, and in that at least one movable wall is journalled parallel to the channel and maneuvered by appropriate means in an ascending or descending fashion around its articulation axis to define a variable volume which is generally inclined with respect to the channel, which on the one hand contributes to the formation of liquid currents stirring the fluid body, and on the other hand facilitates the rupture of the marc cake, its mixture with the liquid, and ultimately its evacuation.

According to another characteristic of the invention, the device comprises a median channel and a movable wall on both sides of the channel, each of the walls respectively comprising two panels journalled along an axis located between them. One panel is also journalled to the channel, and the other is journalled to the lateral wall of the container and/or movable thereon along vertical sides of the wall.

According to another characteristic of the invention, the movable walls are activated by at least one vertical beam or system of beams, either vertical or horizontal, which are axially mobile and controlled from the interior of the container. A system of rods connects the walls at the level of articulation of the respective panels between them.

According to yet another characteristic of the invention, on the beam or the beam system which controls the inclination of the mobile journalled walls to the channel a mobile or fixed grille is preferably mounted, at the level of the marc cake, the purpose of which is to maintain and/or to break the cake during the raising or lowering movement of the beam, or independently thereof.

BRIEF DESCRIPTION OF THE DRAWINGS

Other advantages and characteristics of the invention will appear from a reading of the following description, one embodiment of which is given by way of non-limiting example and illustrated by the annexed drawings, in which.

DETAILED DESCRIPTION OF THE DRAWINGS

Figure 1:
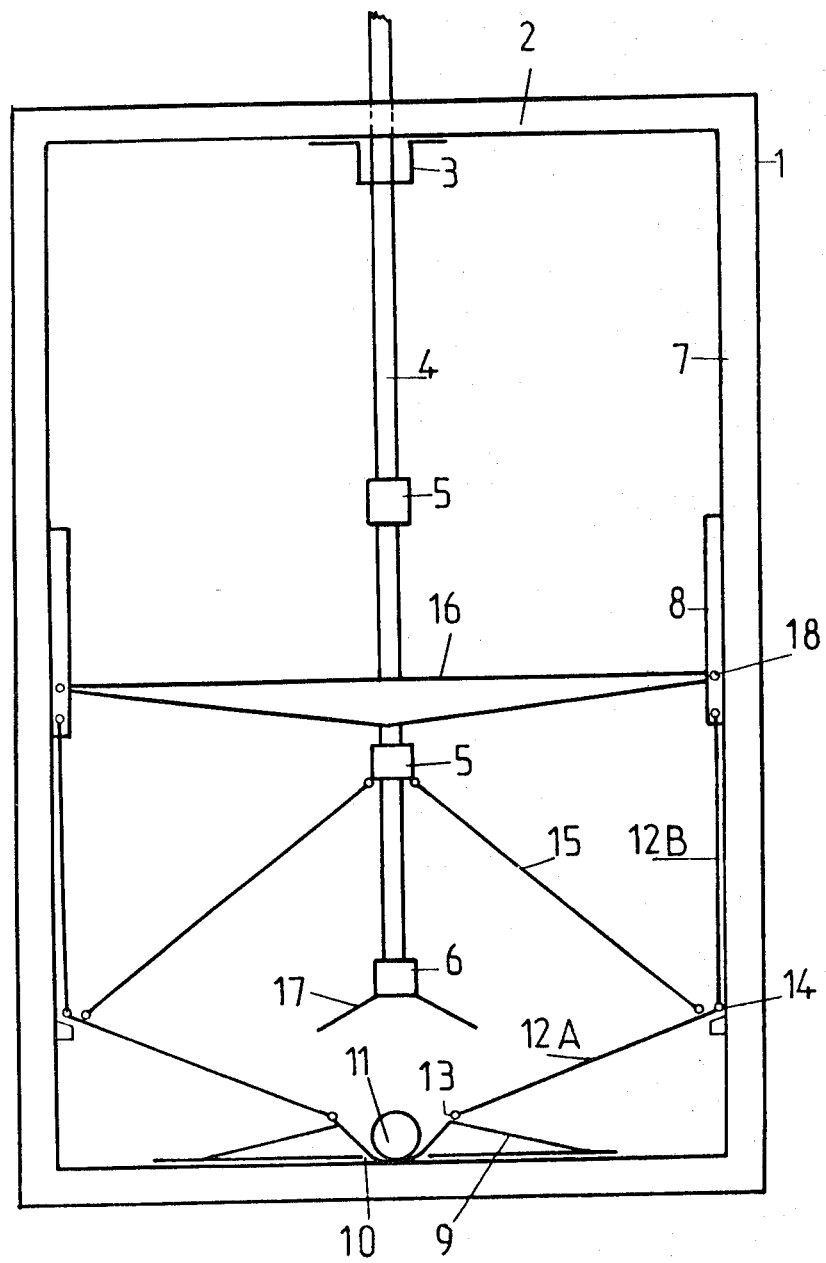
FIG. 1 is a vertical cross-sectional view of a vinification container equipped with a device according to the invention.

As shown, the enclosure 1 is a vinification container of the conventional type, having a rectangular shape, although it is obvious that the device according to the invention can be adapted to all types of containers. The ceiling 2 of the container is provided, where a filling chute passes through the container, with a horizontal beam 3 within the container and substantially medially located on the ceiling. The beam 3 is provided with slits through which one or more vertical beams 4 slide. In this instance, it is provided with three vertical parallel beams 4 which are regularly spaced. This beam system is axially movable by any means known to one of ordinary skill in the art, such as screws, jacks, or hydraulic devices, which are not shown in order to simplify the drawings, and which are normally arranged outside of the container. The beams 4 are connected by two horizontal regularly spaced braces 5 and by a lower horizontal beam 6. Each of the braces 5 is arranged or positioned at a point approximately equivalent to one-third of the length of the vertical beams 4. On the lateral walls 7 of the container vertical guides 8 are fixed by bolting or any other means.

Figure 2:
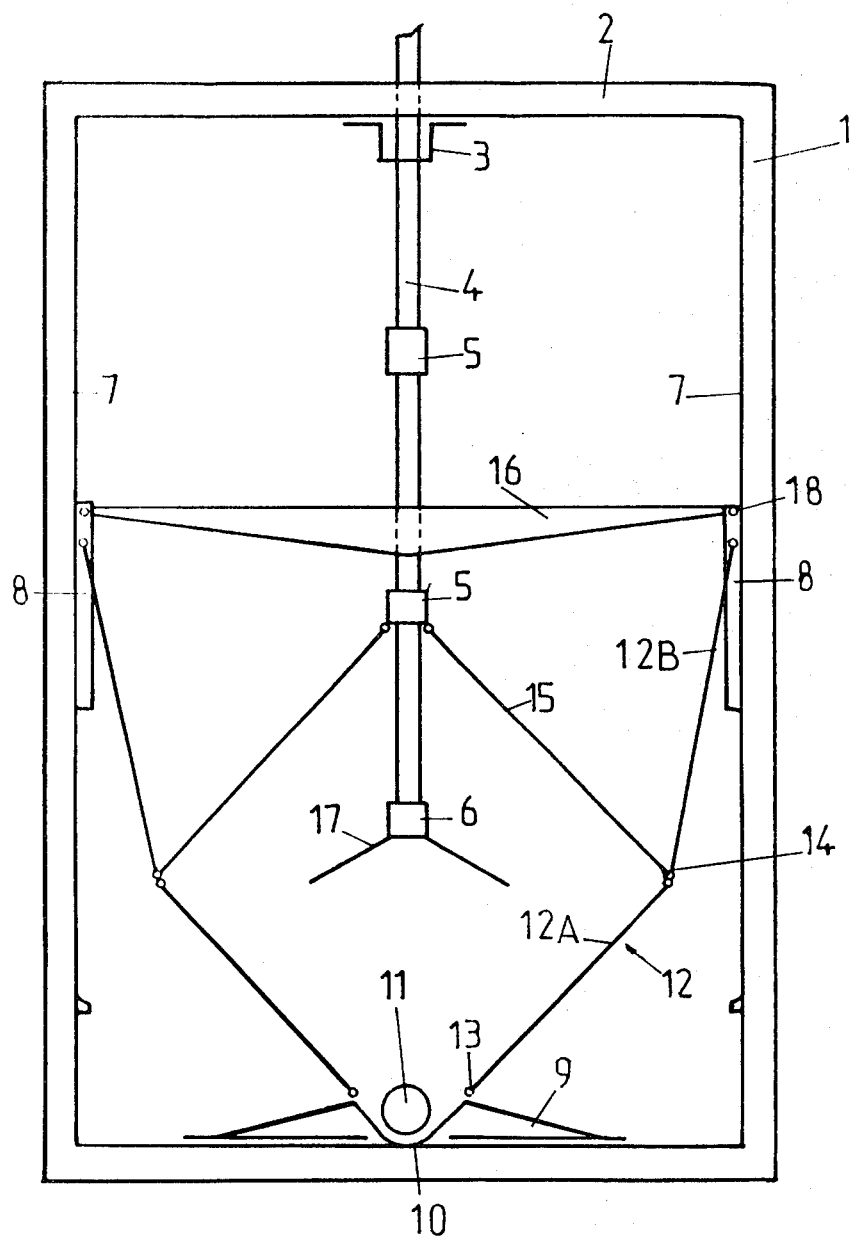
FIG. 2 is a view similar to that of FIG. 1 in which the position of the mobile walls is different from that of FIG. 1.

On the bottom of the container and on the axis of the grape harvest chute, a support assembly is mounted which comprises two metal fittings 9 and a channel 10 in which an endless screw 11 rotates axially. The screw is controlled from the exterior of the container by any known device, which can for example be a motoreducer assembly mounted on a movable chassis, so as to be autonomous of the container. On both sides of the channel 10 are arranged two walls 12, which are connected to the channel by an articulation system or axis 13 arranged parallel to the channel. Each of the walls 12 comprises a lower panel 12A journalled at 13 to the channel and an upper panel 12B journalled at 14 to the panel 12A in a direction parallel to the channel. The upper panel 12B is provided at its end with axes 15 carrying rollers which slide in guides 8. The overall assembly of the device defines an inverted rectangular umbrella whose walls are constituted by the panels and are susceptible, by virtue of their journal systems 13 and 14, to relative angular deformation around the articulation axes, while resulting on the interior of the container in a variable volume which, by its angular deformation in the ascending position, will have as a function to ultimately break the cake marc in the course of vinification and direct it towards the endless screw, which will then eject it to the exterior of the container after vinification. The control of the variable volume defined by panels 12A and 12B on both sides of the channel 10 is realized by a rod system 15 integral with the vertical beam system 4 and which connects brace 5 to the journal axis 14. Preferably, two rod systems are attached at each end 5 of the brace. According to the invention, by raising (FIG. 2) the beam system, the beam will stab the cake marc at a middle portion in order to break it up. To this end, the brace or lower beam 6 is advantageously provided with inclined walls 17, or alternately with a succession of inclined bars which are oriented in the same manner as the walls 17 which they replace and which act to break the cake and the mass which constitutes it, and equally act with walls 12 to stir the liquid and the cake marc. It should be noted that together with the upward movement of beam system 4, 5, and 6, the walls 12A and 12B are raised, the inclination of which (FIG. 2) will facilitate the evacuation of the broken cake towards the channel after vinification. By way of example, the maximum inclination of the lower walls 12A and upper walls 12B will be on the order of 30 degrees to 50 degrees.

According to another embodiment of the invention (not shown), the beam system can be activated by raising and lowering movement which is independent of any movement of walls 12A, 12B, or 16, which will be mentioned below, which makes it possible to break the marc cake in the course of its formation during vinification, and particularly to create opposition to the movement between the beam system and the mobile walls 12A and 12B. On the beam system a substantially horizontal wall 16 is mounted, which is perforated and provided with an orifice (not shown) to allow for the passage of the feed conduit of the container. The wall 16 or cap is provided with a sliding device (not shown) on vertical beam system 4 to allow for ascending or descending movement to adjust the height of the marc cake which is located above the juice. To facilitate sliding and positioning of the wall 16, it is provided with a bank of shafts 18 having rollers arranged in the parallel guides 8 which are attached to the walls of the container. The wall 16 can comprise one or more panels articulated between the guides and which are removable or replaceable.

Figure 3:
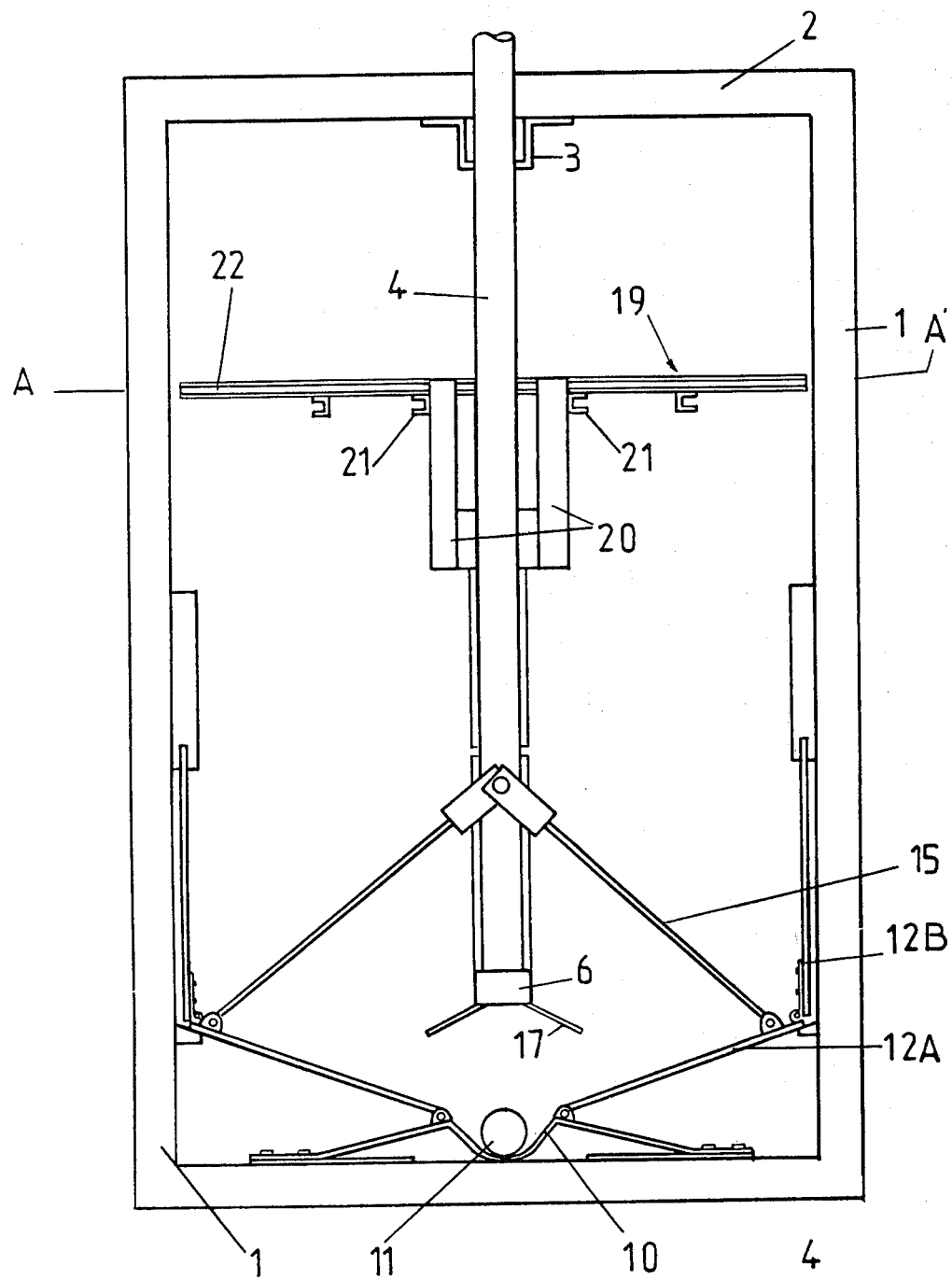
FIG. 3 is a vertical cross-sectional view of a container according to another embodiment of the invention.
Figure 4:
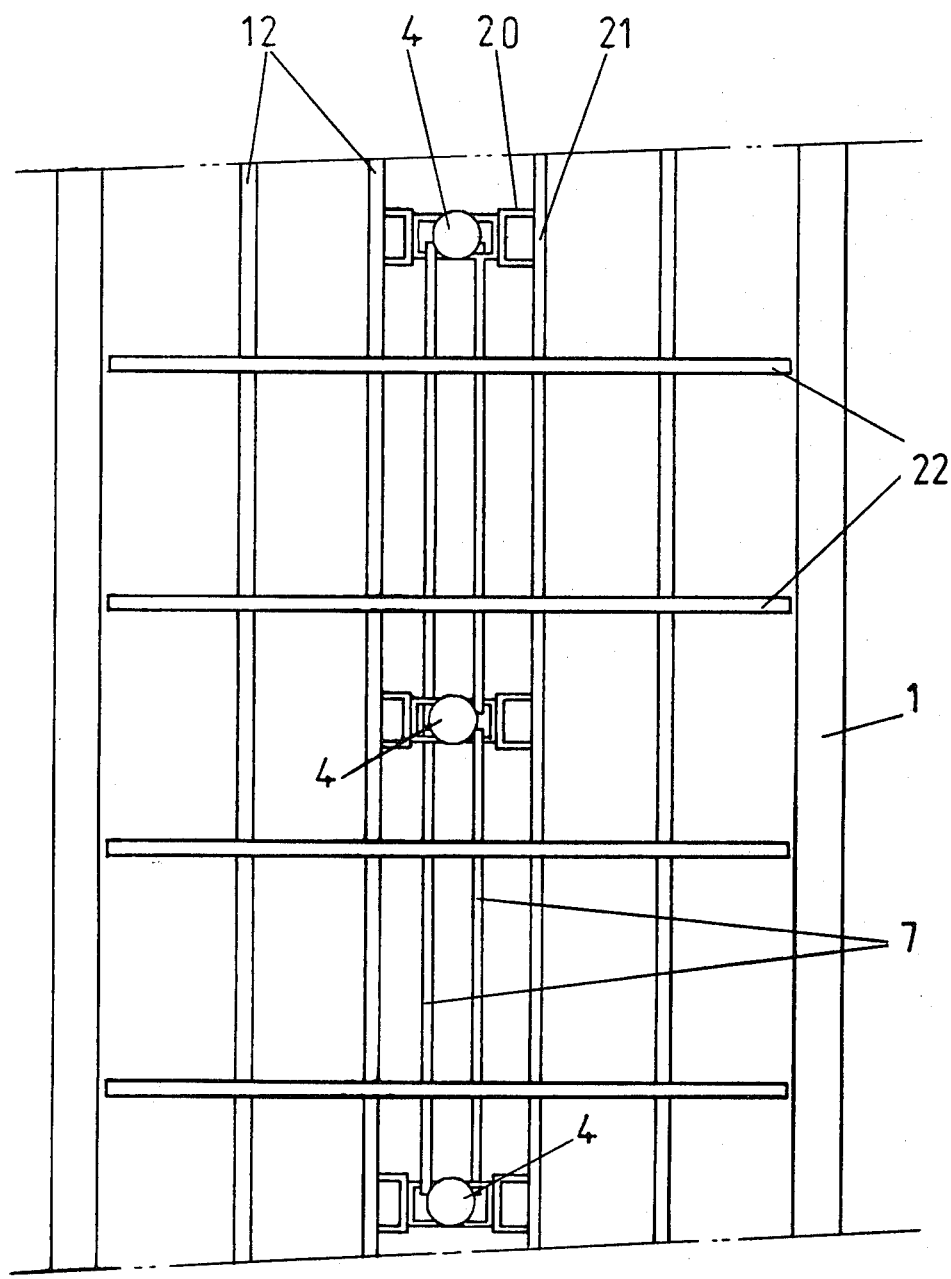
FIG. 4 is a horizontal cross-sectional view taken along the reference letters A—A of FIG. 3.
Figure 5:
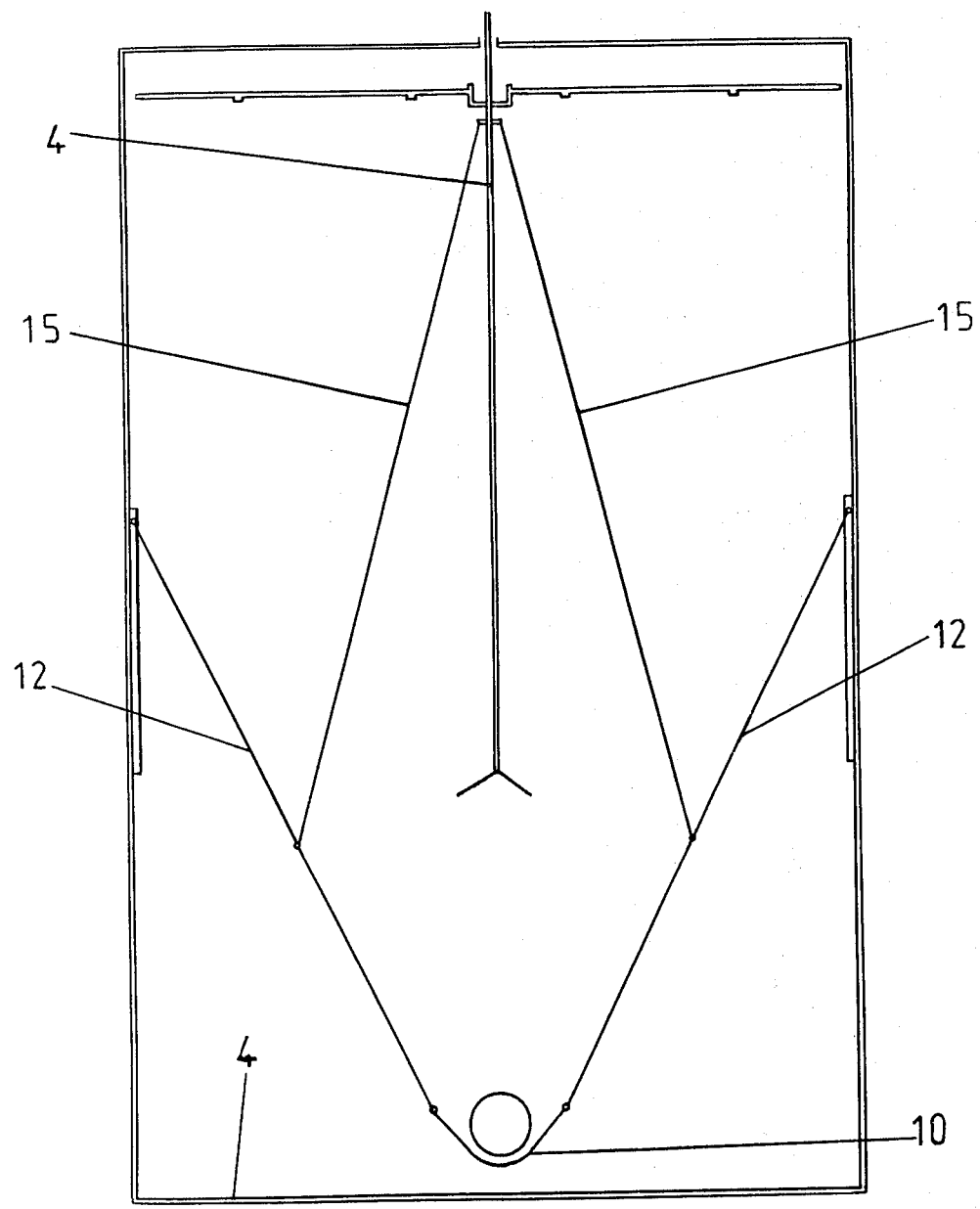
FIG. 5 is a view of a container according to another embodiment of the invention.

As shown in FIGS. 3, 4, and 5, above the mobile walls and mounted angularly thereto is a horizontal grill 19, which rests on vertical supports 20 and which is integral with the beam system 4; the grill is located at the level of the marc cake at the upper portion of the container. Vertical supports 20 advantageously comprise metallic tracks of the same dimension, each track being of U-shaped transverse cross-section and being provided with two parallel wings connected by a web. Against the upper ends of the vertical supports 20 are fixed at least two horizontal mainbeams 21 of the grill 19, which are arranged parallel to the beam system 4 on both sides thereof. Each of these two mainbeams advantageously comprises a metallic track of U-shaped transverse cross-section provided with two wings connected by a web. The mainbeams are arranged in a manner such that the wings are horizontal and symmetrically with respect to the beam system. On these mainbeams 21 are fixed by welding or any other process a series of horizontal transverses 22, which are regularly spaced and perpendicular to the mainbeams. Each transverse beam 22 equally comprises a metallic track having a U-shaped transverse cross-section of the same dimension as the track comprising each mainbeam. Preferably these transverse beams 22 are arranged such that their wings are parallel to the end of the container. These mainbeams and transverses which comprise the grill are preferably made out of stainless steel of "food" quality. Their number and their spacing varies as a function of the dimensions of the container and the conditions of use. The ends of mainbeams 21 and transverses 22 define an interior contour of a horizontal cross-section of the container such that the clearance between the ends of the beams and the internal and vertical walls of the said container is as small as possible, for example, on the order of several centimeters.

According to another embodiment, the elements constituting the grill are made out of wood, and are attached to one another by bolts provided with screws or by any known device. It is easily understood that the vertical ascending or descending movement of the horizontal grill 19 depends upon the ascending or descending movement of the beam system 4. It is self-evident that the grill system 19 can be mounted on the beam system 4 in any other manner than that which is described and shown above with respect to the spaced supports 20.

According to another embodiment of the invention, the grill is fixed to rings or sockets which slide on the beams, and is activated by an element adapted to give it an ascending or descending movement independent of the movement of the beam system. The grill can equally well be fixed directly to the beams to the exclusion of all of the vertical supports lateral to the beams. After introduction of pressed grapes into the container 1, the grill 19 is lowered under the level of the liquid, and in the course of decantation of the grapes the solid constituents such as the stalks, small pits and grapeskins rise above the grape juice, agglomerating themselves into a compact block to form the cake marc which is blocked under the grill. The vertical ascending or descending movement of the beam system 4 and of the horizontal grill 19 causes, by means of rod system 15, angular movement of the movable walls 12 and the creation of a liquid current which exerts a pressure on the cake marc. In the course of this movement, or during the vertical movement of the grill, these bars serve to break the cake marc, the pieces of which will mix, as explained above, with the juice. Furthermore, the continuous movement of the grill in the liquid, subjugated to the action of the movable walls, causes a continuous stirring of the mixture, which prevents, during the duration of fermentation of the grape juice, the formation of the cake marc.

According to the embodiment shown in FIG. 5, the channel 10 is suspended above the bottom of the container, and is fixed at each of its ends by any known means and/or device to at least two vertical walls of the container. This arrangement permits, after evacuation of the marc cake, the facilitation on one hand of the removal of residue which remains at the bottom of the container, and on the other hand cleaning of the container bottom. Furthermore, to diminish necessary travel of the beam system 4 so that the movable flaps 12A and 12B position themselves as extensions of one another, the length of the rods 15 is increased and their pivot point is replaced along the beam system. The pivot point moves to situate itself with respect to the beam system in the raised position so that it will be as close as possible to the upper horizontal wall of the container. This arrangement equally permits diminution of the traction forces exerted on rods 15 and shearing forces exerted on the journal axes. As a result, the cross-section of rods 15 and of their articulation axes will be able to be diminished as much as possible. The angularly mobile walls 12 can be made out of any material.

The invention makes it possible, on one hand, to render or convert conventional vinification containers into self-emptying containers at a low cost, and on the other hand, to obtain by the conjugate action of walls, which also serve to empty the container, and of the grill, during a relatively long period in the course of fermentation, a better mixture of liquid and of the grape residue which makes it possible to obtain better vinification.

I claim:

1. A device for transforming an enclosure or container, such as a vinification container adapted to receive a fluid such as pressed grapes which fluid is adapted to be separated by decantation into a liquid such as wine and a residue comprising particulate solids, such as marc cake, into a self-evacuating container, said device comprising:
   (a) an axially arranged rotating evacuation device positioned in a channel, said channel being adapted to be positioned at the bottom of said container;
   (b) at least one movable wall journalled around an axis parallel to said panel;
   (c) means for selectively raising or lowering at least one movable wall around its axis, and whereby said at least one movable wall may be raised and lowered so as to define a variable volume, said raising or lowering means thereby comprising means for creating liquid currents to stir said fluid as well as means for facilitating rupture of said marc cake, mixture of said marc cake with said liquid, and evacuation of said marc cake from said container.

2. The device as defined by claim 1 comprising one movable wall journalled on each side of said channel and forming a generally V-shaped configuration having said evacuation device at its apex.

3. The device as defined by claim 2 wherein each of said moveable walls comprises a lower panel journaled to said channel and an upper panel journaled onto said lower panel.

4. The device as defined by claim 3 wherein said upper panel is adapted to be journaled onto a wall of said container.

5. The device as defined by claim 3 wherein said upper panel is mounted in vertical slides, said slides being adapted to be mounted on a wall of said container.

6. The device as defined by either of claims 4 or 5 further comprising at least one vertical beam attached to said container and adapted to reciprocate within said container, a portion of said vertical beam extending to the exterior of said container and a lower portion of said vertical beam connected to said movable walls, said vertical beam comprising part of said raising or lowering means.

7. The device as defined by claim 6 wherein said upper panel is adapted to be journalled onto said container wall and wherein said device further comprises a rod system for connecting each of said movable walls at the general level at which said upper panels are journalled and between said panels, said rod system connecting said vertical beam to said movable walls.

8. The device as defined by claim 6 further comprising a lower horizontal median beam with inclined walls or bars depending downwardly therefrom for stirring said fluid as said vertical beam reciprocates.

9. The device as defined by claim 6 further comprising a lower horizontal median beam with a plurality of inclined downwardly directed bars for stirring said fluid as said vertical beam reciprocates.

10. The device as defined by claim 6 comprising a horizontal wall mounted to reciprocate with said vertical beam so as to break said cake marc.

11. The device as defined by claim 6 further comprising a grill for maintaining said cake marc at a desired level and for breaking said cake marc as said vertical beam reciprocates, said grill being attached to said vertical beam.

12. The device as defined by claim 11 wherein said grill comprises at least two vertical main beams positioned on opposite sides of said vertical beam and arranged parallel thereto.

13. The device as defined by claim 12 wherein said grill further comprises a series of spaced transverses and horizontal mainbeams and wherein said vertical mainbeams and said transverses have a shape adapted to mate with corresponding horizontal mainbeams.

14. A device as defined by claim 1 which is placed within said enclosure.

* * * * *